(12) United States Patent
Sohn et al.

(10) Patent No.: US 12,067,360 B2
(45) Date of Patent: Aug. 20, 2024

(54) RECIPIENT BASED TEXT PREDICTION FOR ELECTRONIC MESSAGING

(71) Applicant: Google LLC, Mountain View, CA (US)

(72) Inventors: Timothy Youngjin Sohn, Los Altos, CA (US); Bogdan Prisacari, Adliswil (CH); Paul Roland Lambert, Redwood City, CA (US); Victor Anchidin, Adliswil (CH); Balint Miklos, Zürich (CH); Julia Proskurnia, Adliswil (CH); Bryan Kenneth Rea, Zürich (CH); Thijs Van As, Zürich (CH); Matthew Vincent Dierker, Palo Alto, CA (US); Jacqueline Amy Tsay, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 862 days.

(21) Appl. No.: 17/052,382

(22) PCT Filed: May 6, 2019

(86) PCT No.: PCT/US2019/030916
§ 371 (c)(1),
(2) Date: Nov. 2, 2020

(87) PCT Pub. No.: WO2019/217314
PCT Pub. Date: Nov. 14, 2019

(65) Prior Publication Data
US 2021/0174020 A1    Jun. 10, 2021

Related U.S. Application Data

(60) Provisional application No. 62/667,836, filed on May 7, 2018.

(51) Int. Cl.
*G06F 40/274* (2020.01)
*G06F 40/56* (2020.01)
(Continued)

(52) U.S. Cl.
CPC ............ *G06F 40/274* (2020.01); *G06F 40/56* (2020.01); *G06N 3/08* (2013.01); *G06N 20/20* (2019.01); *H04L 51/216* (2022.05); *H04L 51/42* (2022.05)

(58) Field of Classification Search
CPC ........ G06F 40/274; G06F 40/10; G06F 40/16; G06F 40/166; G06F 40/20; G06F 40/279; G06F 40/35; G06F 40/56
(Continued)

(56) References Cited

U.S. PATENT DOCUMENTS 8,370,143 B1    2/2013  Coker
9,171,291 B2   10/2015  Martin et al.
(Continued)

FOREIGN PATENT DOCUMENTS

CN    101079851 A    11/2007
CN    101315624 A    12/2008
(Continued)

OTHER PUBLICATIONS

Communication pursuant to Article 94(3) EPC from counterpart European Application No. 19725487.3 dated Nov. 29, 2022, 6 pp.
(Continued)

*Primary Examiner* — Qi Han
(74) *Attorney, Agent, or Firm* — Shumaker & Sieffert, P.A.

(57) ABSTRACT

An example method includes receiving, by a computing system, an identification of a recipient of an electronic message being composed from a message account associated with a user; predicting, by the computing system and based on text contained in previous electronic messages sent from the message account, text for a body of the electronic
(Continued)

message; and outputting, for display, the predicted text for optional selection and insertion into the body of the electronic message.

19 Claims, 9 Drawing Sheets

(51) Int. Cl.
  *G06N 3/08* (2023.01)
  *G06N 20/20* (2019.01)
  *H04L 51/216* (2022.01)
  *H04L 51/42* (2022.01)

(58) Field of Classification Search
  USPC .......................................... 704/9, 1, 4, 7, 257
  See application file for complete search history.

(56) References Cited

U.S. PATENT DOCUMENTS

| | | | |
|---|---|---|---|
| 2005/0154692 | A1 | 7/2005 | Jacobsen et al. |
| 2009/0228583 | A1 | 9/2009 | Pocklington et al. |
| 2011/0087961 | A1 | 4/2011 | Fitusi et al. |
| 2011/0246575 | A1 | 10/2011 | Murayama et al. |
| 2013/0289977 | A1 | 10/2013 | Tanaka et al. |
| 2014/0122622 | A1* | 5/2014 | Castera .................. H04L 51/04 709/206 |
| 2014/0163954 | A1 | 6/2014 | Abhijit et al. |
| 2015/0058426 | A1 | 2/2015 | Caskey et al. |
| 2016/0306800 | A1 | 10/2016 | Son et al. |
| 2017/0201471 | A1 | 7/2017 | Miklos et al. |
| 2017/0235848 | A1 | 8/2017 | Van Dusen et al. |
| 2017/0270092 | A1* | 9/2017 | He ........................ G06F 3/0482 |
| 2017/0318061 | A1 | 11/2017 | Zha |
| 2018/0089588 | A1 | 3/2018 | Ravi et al. |
| 2018/0212908 | A1* | 7/2018 | Knudson ............... G06F 40/279 |
| 2019/0197101 | A1 | 6/2019 | Lambert et al. |

FOREIGN PATENT DOCUMENTS

| | | |
|---|---|---|
| CN | 103065237 A | 4/2013 |
| CN | 105897552 A | 8/2016 |
| EP | 3174047 A1 | 5/2017 |
| GB | 2470585 A | 1/2010 |

OTHER PUBLICATIONS

First Examination Report from counterpart Indian Patent Application No. 202047048334 dated Dec. 7, 2021, 4 pp.
International Search Report and Written Opinion of International Application No. PCT/US2019/030916, mailed Nov. 19, 2020, 7 pp.
Response to First Examination Report dated Dec. 7, 2021, from counterpart Indian Application No. 202047048334 filed Mar. 11, 2022, 6 pp.
International Search Report and Written Opinion of International Application No. PCT/US2019/030916, mailed Jul. 12, 2019, 12 pp.
"Automatically Add Greetings When Sending Outlook Emails", Email Productivity Software, retrieved from http://www.emailaddressmanager.com/outlook/greetings, Apr. 27, 2018, 2pp.
Brown et al., "Class-Based n-gram Models of Natural Language," vol. 18, No. 4, 1992, 13pp.
Response to Communication Pursuant to Rules 161(1) and 162 EPC dated Dec. 15, 2020, from counterpart European Application No. 19725487.3, filed Jun. 9, 2021, 14 pp.
Response to Communication pursuant to Article 94(3) EPC dated Nov. 29, 2022, from counterpart European Application No. 19725487.3 filed Mar. 28, 2023, 16 pp.
First Office Action and Search Report, and translation thereof, from counterpart Chinese Application No. 201980045721.5 dated Sep. 26, 2023, 8 pp.
Communication pursuant to Article 94(3) EPC from counterpart European Application No. 19725487.3 dated Apr. 11, 2024, 6 pp.
Hearing Notice from counterpart Indian Application No. 202047048334 dated Apr. 30, 2024. 2 pages.
Office Action, and translation thereof, from counterpart Chinese Application No. 201980045721.5 dated Mar. 21, 2024, 15 pp.

* cited by examiner

US 12,067,360 B2

RECIPIENT BASED TEXT PREDICTION FOR ELECTRONIC MESSAGING

This application is a national stage application under 35 U.S.C. § 371 of PCT Application No. PCT/US2019/030916, filed May 6, 2019, which claims the benefit of U.S. Provisional application No. 62/667,836, filed May 7, 2018.

BACKGROUND

Some computing systems provide electronic messaging (e.g., e-mail) services that facilitate quick and easy communication between users of computing devices. Drafting and otherwise editing electronic messages can be cumbersome and take a lot of time, which may result in reduced use of electronic messages and/or inefficient communication of information.

SUMMARY

In general techniques of this disclosure are directed to enabling text prediction for editing electronic messages based on recipients of the electronic messages. An example computing system (such as an e-mail system) is described that is configured to provide suggested text to a user that is editing an electronic message. For instance, after the user has entered in the recipients (i.e., the addressees) into an electronic message, the computing system may predict and offer candidate text for the body of the electronic message. The computing system may predict the candidate text based on previous text used by the user (e.g., the computing system may utilize one or more machine learning models trained on the electronic messages previously sent by the user). In this way, the computing system may increase the speed at which electronic messages are composed.

In one example, a method includes receiving, by a computing system, an identification of a recipient of an electronic message being composed from a message account associated with a user; predicting, by the computing system and based on text contained in previous electronic messages sent from the message account, text for a body of the electronic message; and outputting, for display, the predicted text for optional selection and insertion into the body of the electronic message.

In another example, a computing system includes one or more user interface components configured to receive typed user input; and one or more processors. In this example, the one or more processors are configured to: receive an identification of a recipient of an electronic message being composed from a message account associated with a user; predict, based on text contained in previous electronic messages sent from the message account, text for a body of the electronic message; and output, for display, the predicted text for optional selection and insertion into the body of the electronic message.

In another example, a computer-readable storage medium is described that includes instructions, that when executed, cause at least one processor of a computing system to receive an identification of a recipient of an electronic message being composed from a message account associated with a user; predict, based on text contained in previous electronic messages sent from the message account, text for a body of the electronic message; and output, for display, the predicted text for optional selection and insertion into the body of the electronic message.

In another example, a system is described that includes means for receiving an identification of a recipient of an electronic message being composed from a message account associated with a user; means for predicting, based on text contained in previous electronic messages sent from the message account, text for a body of the electronic message; and means for outputting, for display, the predicted text for optional selection and insertion into the body of the electronic message.

Throughout the disclosure, examples are described wherein a computing device and/or computing system may analyze information (e.g., e-mail, other communications, and the like) associated with the computing device the user of the computing device only if the computing device and/or the computing system receives explicit permission from the user of the computing device to analyze the information. For example, in situations discussed below in which the computing device and/or computing system may collect or may make use of communication information associated with the user and the computing device, the user may be provided with an opportunity to provide input to control whether programs or features of the computing device and/or computing system can collect and make use of user information (e.g., information about a user's e-mail, a user's social network, social actions or activities, profession, a user's preferences, or a user's past and current location), or to dictate whether and/or how the computing device and/or computing system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and/or computing system.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 3A through 3E are described below in the context of models 267 of FIG. 2. For example, in some instances, machine-learned model 300, as referenced below, may be an example of model 267.

DETAILED DESCRIPTION

Figure 1A:
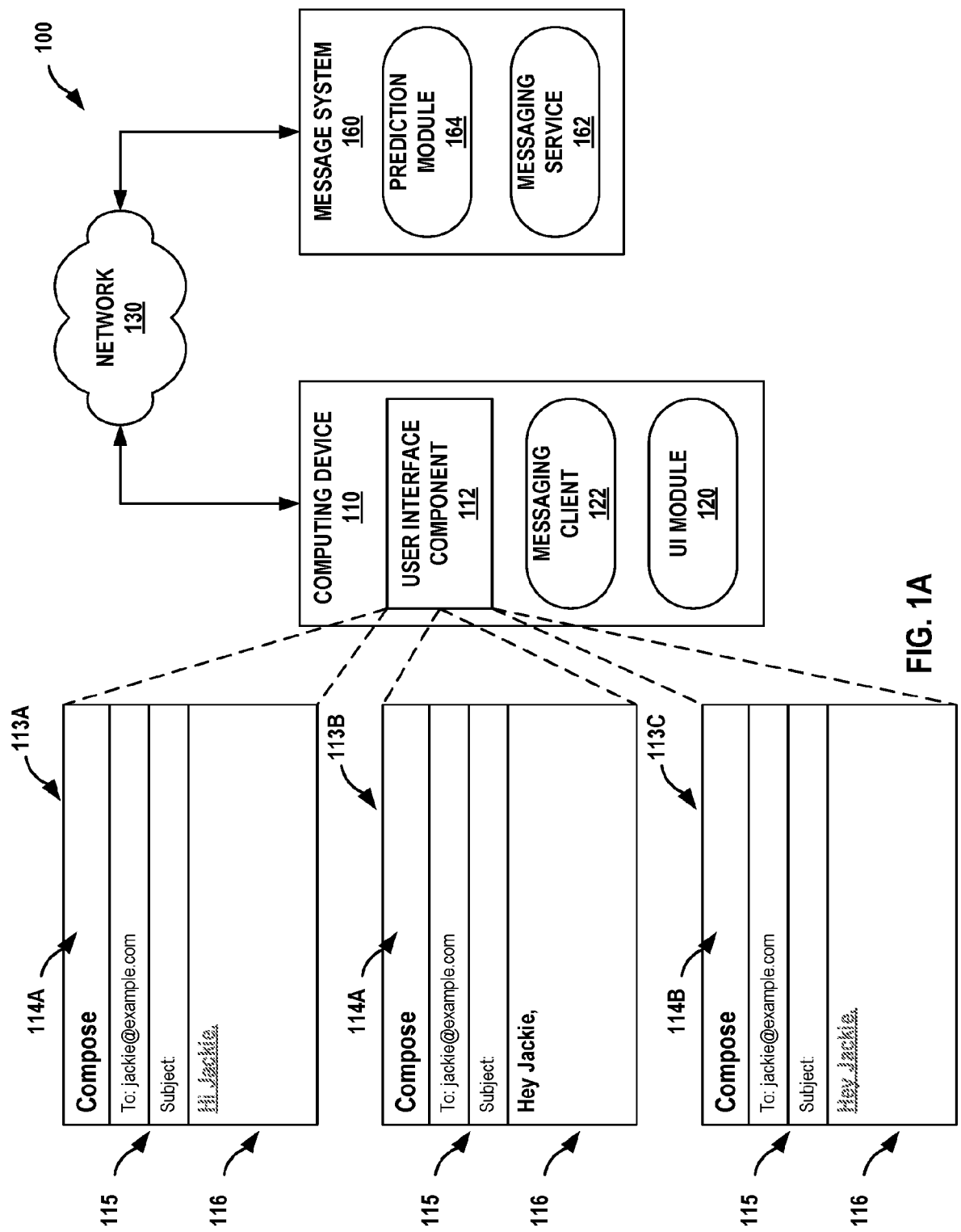
FIG. 1A is a conceptual diagram illustrating an example communication system configured to provide predicted text suggestions to a user editing an electronic message, in accordance with one or more aspects of the present disclosure.
Figure 1B:
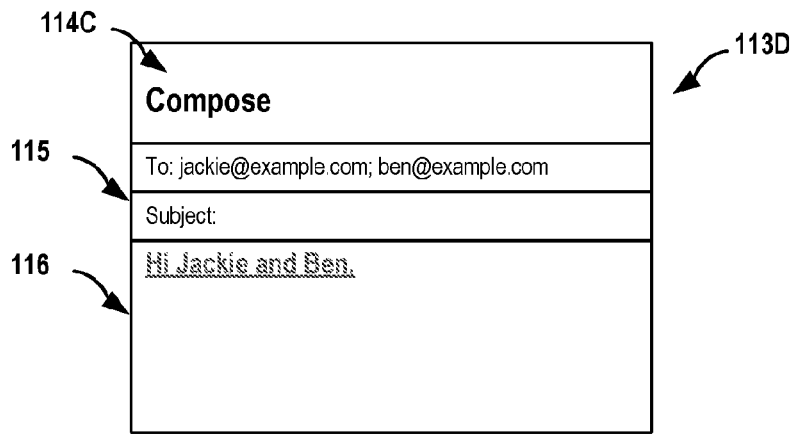
FIG. 1B is a conceptual diagram illustrating example user interfaces for electronic message editing, in accordance with one or more aspects of the present disclosure.
Figure 1B:
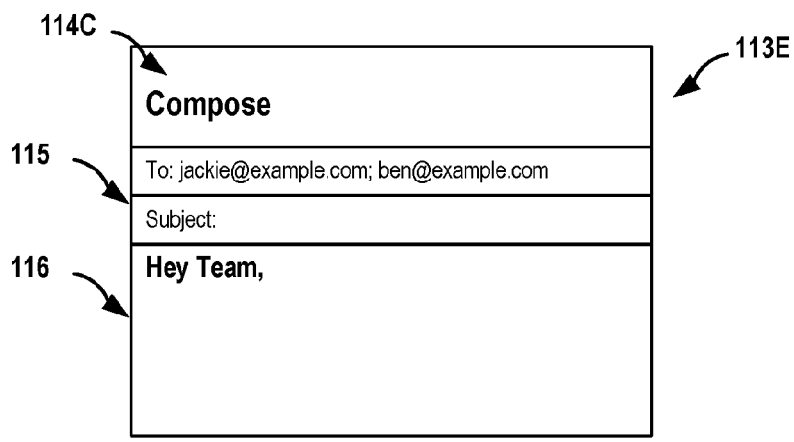
Figure 1B:
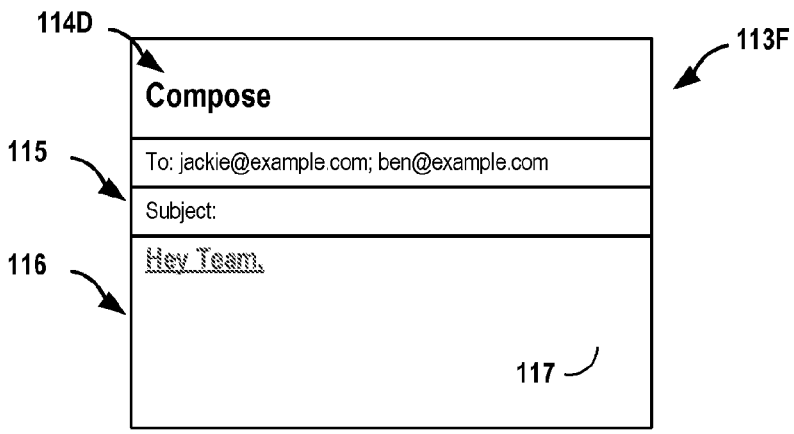

FIG. 1A is a conceptual diagram illustrating an example communication system configured to provide predicted text suggestions to a user editing an electronic message, in accordance with one or more aspects of the present disclosure. FIG. 1B is a conceptual diagram illustrating example user interfaces for electronic message editing, in accordance with one or more aspects of the present disclosure. System 100 of FIG. 1A includes message system 160 in communication, via network 130, with computing device 110. Although system 100 is shown as being distributed amongst message system 160 and computing device 110, in other examples, the features and techniques attributed to system 100 may be performed internally, by local components of computing device 110.

Network 130 represents any public or private communications network, for instance, cellular, Wi-Fi, and/or other types of networks, for transmitting data between computing systems, servers, and computing devices. Message system 160 may exchange data, via network 130, with computing device 110 to provide a messaging service that is accessible to computing device 110 when computing device 110 is connected to network 130. Network 130 may include one or more network hubs, network switches, network routers, or any other network equipment, that are operatively intercoupled thereby providing for the exchange of information between message system 160 and computing device 110. Computing device 110 and message system 160 may transmit and receive data across network 130 using any suitable communication techniques. Computing device 110 and message system 160 may each be operatively coupled to network 130 using respective network links. The links coupling computing device 110 and message system 160 to network 130 may be Ethernet or other types of network connections and such connections may be wireless and/or wired connections.

Message system 160 represents any suitable remote computing system, such as one or more desktop computers, laptop computers, mainframes, servers, cloud computing systems, etc., that is configured to hosting an electronic messaging service. For example, messaging system 160 may be one or more mail servers configured to provide an e-mail messaging service. Computing device 110 represents an individual mobile or non-mobile computing device that is configured to access the messaging service provided by message system 160. Examples of computing device 110 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or security system), a voice-interface or countertop home assistant device, a personal digital assistants (PDA), a gaming system, a media player, an e-book reader, a mobile television platform, an automobile navigation or infotainment system, or any other type of mobile, non-mobile, wearable, and non-wearable computing device configured to access an electronic messaging service.

Message system 160 includes prediction module 164 and messaging service module 162; computing device 110 includes user interface component ("UIC") 112, user interface ("UI") module 120, and messaging client module 122. Modules 120, 122, 162, and 164 may perform operations described herein using software, hardware, firmware, or a mixture of hardware, software, and firmware residing in and/or executing at computing device 110. Computing device 110 and message system 160 may execute modules 120, 122, 162, and 164 with multiple processors or multiple devices, as virtual machines executing on underlying hardware, as one or more services of an operating system or computing platform, and/or as one or more executable programs at an application layer of a computing platform of computing device 110 or message system 160.

UIC 112 of computing device 110 functions as an input and/or output device for computing device 110. UIC 112 may be implemented using various technologies. For instance, UIC 112 may function as an input device using presence-sensitive input screens, microphone technologies, infrared sensor technologies, or other input device technology for use in receiving user input. UIC 112 may function as output device configured to present output to a user using any one or more display devices, speaker technologies, haptic feedback technologies, or other output device technology for use in outputting information to a user. As an input device, UIC 112 detects input (e.g., touch and non-touch input) from a user of computing device 110. Examples of user input gestures performed by a user (e.g., the user touching, pointing, and/or swiping at or near one or more locations of UIC 112 with a finger or a stylus pen). As an output device, UIC 112 presents information (e.g., audible, visual, and/or haptic information) to a user in the form of a graphical user interface.

UI module 120 of computing device 110 controls UIC 112 including determining what UIC 112 presents and what information is exchanged between UIC 112 and other applications or components of computing device 110. For example, in controlling what UIC 112 displays, UI module 120 may receive information from a component of computing device 110, such as messaging client module 122, for generating user interface 113 and elements thereof. In response, UI module 120 may output instructions and information to UIC 112 that cause UIC 112 to display a user interface of user interfaces 113 according to the information received from messaging client module 122. When handling input detected by UIC 112, UI module 120 may receive information from UIC 112 in response to inputs detected at locations of a screen of UIC 112 at which elements of user interface 113 are displayed. UI module 120 disseminates information about inputs detected by UIC 112 to other components of computing device 110 for interpreting the inputs and for causing computing device 110 to perform one or more functions in response to the inputs.

User interfaces 113A-113F (collectively, "user interfaces 113") represent graphical user interfaces from which a user of computing device 110 can interact with a messaging service accessed by computing device 110, such as the messaging service provided by message system 160. As illustrated in FIGS. 1A and 1B, user interfaces 113 each include a view of a message currently bring composed. Specifically, user interfaces 113A and 113B include respective views of a first message being composed (i.e., first electronic message 114A), user interface 113C includes a view of a second message being composed (i.e., second electronic message 114B), user interfaces 113D and 113E include respective views of a third message being composed (i.e., third electronic message 114C), and user interface 113F includes a view of a fourth message being composed (i.e., fourth electronic message 114D).

Messaging client module 122 and messaging service module 162 communicate via network 130 to provide a messaging service to computing device 110. Examples of a messaging service include: e-mail service, text messaging service, simple service messaging, social media messaging service, voice message service, video message service, or any other service that facilitates the exchange of human-readable electronic messages. As used throughout the disclosure, the term "electronic message" is used to generally describe any type of human-readable electronic message that might be transmitted between computing devices. Examples of electronic messages include: instant messages, chat messages, electronic mail (e-mail) messages, social media communications, voicemail messages, video messages, or any other type of person-to-person communication that is accessed via a computing device.

Messaging client module 122 provides the front-end, user facing features of the messaging service whereas messaging service module 162 supports the back-end operations needed to implement the messaging service on network 130. Messaging client module 122 may function as a portal from which computing device 110 accesses electronic messages stored at message system 160 and/or at computing device 110. Messaging client module 122 may provide an editing interface via which a user may compose new electronic messages and/or reply or forward electronic messages stored at message system 160 and/or at computing device 110. Composing new electronic messages, replaying to electronic messages, and forwarding electronic messages may collectively be considered to be editing electronic messages. Messaging client module 122 may be an e-mail application, web application, or other module executing at computing device 110 that communicates with message system 160 to provide a user of computing device 110 with access to messages maintained at message system 160 and/or computing device 110.

Messaging service module 162 processes electronic messages received via network 130 from computing device 110 as well as other computing devices and messaging systems that are communicating via network 130. Messaging client module 122 processes inbound electronic messages received via network 130 from message system 160 and sends, via network 130, outbound electronic messages to messaging service module 162 for further processing.

Messaging client module 122 and messaging service module 162 maintain a messaging account associated with a user of computing device 110. That is, messages sent from or received by computing device 110 may be stored in a sent box or an inbox of a messaging account associated with a user of computing device 110. The sent box and inbox may be maintained in memory of computing device 110 and/or message system 160.

In a simple case when handling an inbound message that is destined for computing device 110, messaging service module 162 receives (e.g., via network 130) an electronic message for processing. Messaging service module 162 determines (e.g., from metadata of the electronic message) one or more recipients of the electronic message. If one of the recipients is a messaging account associated with the user of computing device 110, messaging service module 162 may cause a copy of the electronic message to be stored in an inbox of the messaging account associated with the user of computing device 110, whether that messaging account is stored locally at messaging system 160 or computing device 110.

Likewise, when handling an outbound message that originated from computing device 110, messaging service module 162 receives (e.g., via network 130) an electronic message for processing. Messaging service module 162 determines (e.g., from metadata of the electronic message) one or more recipients of the electronic message and sends the message to devices or message systems associated with the one or more recipients. Messaging service module 162 may cause a copy of the electronic message being sent to be stored as a sent item in the messaging account associated with the user of computing device 110, whether that messaging account is stored locally at messaging system 160 or computing device 110.

As discussed above, messaging client module 122 may provide an editing interface via which a user may edit electronic messages. For instance, to enable editing of first electronic message 114A, messaging client module 122 may output user interface 113A that includes one or more of: header fields 115 and message body 116. Header fields 115 may include address fields (e.g., to, cc, bcc, etc.), and a subject line. Messaging client module 122 may interact with one or more other components of system 100 to assist a user with electronic message editing. For instance, in accordance with one or more techniques of this disclosure, messaging client module 122 may interact with prediction module 164 to automatically suggest text for a message body based on text included in previously sent messages.

In some examples, messaging client module 122 may interact with prediction module 164 to automatically suggest text for a message body based on text included in messages previously sent to the recipients of the electronic message. As shown in user interface 113A where the recipient email address "jackie@example.com" has been filled in a "to" field of header fields 115, messaging client module 122 may interact with prediction module 164 to automatically suggest the greeting "Hi Jackie" in message body 116 of first electronic message 113A based on an identification of the recipient of first electronic message 113A being Jackie. As can be seen in FIG. 1A, messaging client module 122 may suggest the text for message body 116 prior to the user entering any text in message body 116.

In some examples, messaging client module 122 may interact with prediction module 164 to automatically suggest text for the message body based on text included in messages previously sent to people (e.g., accounts) other than the recipients of the electronic message. For instance, where the recipient email address "jackie@example.com" has been filled in a "to" field of header fields 115, messaging client module 122 may automatically suggest text for message body 116 based on electronic messages sent to persons other than Jackie.

In some examples, messaging client module 122 may interact with prediction module 164 to automatically suggest text for the message body based on text included in messages previously sent to the recipients of the electronic message and text included in messages previously sent to people other than the recipients of the electronic message. For instance, where the recipient email address "jackie@example.com" has been filled in a "to" field of header fields 115, messaging client module 122 may automatically suggest text for message body 116 based on electronic messages sent to persons other than Jackie and electronic messages sent to Jackie.

Prediction module 164 of message system 160 is configured to automatically provide text suggestions during electronic message editing. Although shown as part of message system 160, in some examples, some or all of prediction module 164 executes as part of computing device 110 where prediction module 164 is configured to automatically provide text suggestions during electronic message editing.

To provide the text suggestions, prediction module 164 may receive an identification of a recipient (or recipients) of an electronic message being edited. The received identification of the recipient may include an email address, a name, or any other identifier of the recipient/addressee of the electronic message.

Based on the received identification of the recipient, prediction module 164 may predict one or more candidate portions of text to insert into the body 116 of the message. Prediction module 164 may predict the candidate portions of text using any number of techniques. For instance, prediction module 164 may predict the candidate portions of text based on text contained in previous electronic messages sent by the user (i.e., sent from the messaging account associated with the user) that were addressed to the identified recipient. In some examples, prediction module 164 may utilize one or more machine learning models to generate the one or more candidate portions of text. In the example of first electronic message 114A, based on the addressee being identified as Jackie, prediction module 164 may generate the following candidate portions of text, "Hi Jackie", "Hi", "Hello", "Dear Jackie".

Prediction module 164 may determine a ranking score or other indication of accuracy or confidence for the candidate portions. In the example of first electronic message 114A, prediction module 164 may determine that "Hi Jackie" is the highest ranked/most likely to be accurate of the candidate portions of text.

Prediction module 164 may output the one or more candidate portions of text to one or more other components of system 100, such as messaging client 122 or UIC 112. In some examples, prediction module 164 may output all of the candidate portions of text. In some examples, prediction module 164 may output fewer than all of the candidate portions of text. For instance, prediction module 164 may only output the N (e.g., 1, 2, 3, 4, 5, etc.) highest ranked/most likely to be accurate portions of text.

Messaging client 122 may output at least one of the one or more candidate portions of text for display to the user. For instance, messaging client 122 may cause UIC 112 to output a user interface that includes the at least one candidate portion of text. As shown in FIG. 1A, UIC 112 may output user interface 113A that includes the highest ranked/most likely to be accurate candidate portion of text "Hi Jackie". The formatting of the displayed candidate portions of text may be the same or different user entered text. For instance, as shown in user interface 113A, the candidate portion of text is displayed in a lighter weight type (e.g., 50% gray) with underlining whereas the user entered text may be displayed in heavier weight type (e.g., black). Other formatting differences, such as bold, italics, highlights, font size, etc., are contemplated.

The user of computing device 110 can accept or reject the displayed suggestion. For instance, the user may provide first user input at UIC 112 (e.g., hitting the enter key) to accept the displayed suggestion. Responsive to receiving an indication of the first user input, messaging client 122 may cause UIC 112 to output a user interface with the displayed candidate portion of text formatted as user entered text. For instance, messaging client 122 may cause UIC 112 to output a user interface 113 that shows candidate portion of text in heavier weight type without underline.

Alternatively, the user may provide second user input at UIC 112 to reject the displayed suggestions. For instance, as shown in user interface 113B, UIC 112 may receive second user input including the text "Hey Jackie." As this text was entered by the user, the text "Hey Jackie" is not formatted as a candidate portion of text and instead is formatted as regular user entered text.

Prediction module 164 may receive an indication that the suggested text was not accepted by the user. In some examples, prediction module 164 may further receive an indication of what text the user entered in place of the suggested text. For instance, after UIC 112 receives the second user input including the text "Hey Jackie," prediction module 164 may receive an indication that the user entered the text "Hey Jackie" as opposed to "Hi Jackie" when composing an email to jackie@example.com. Prediction module 164 may modify its operation based on this feedback. For instance, where prediction module 164 uses machine learning models to predict the text, prediction module 164 may further train the machine learning models based on the feedback.

As such, either the next time the user is composing a message to jackie@example.com (or after multiple rounds of feedback), prediction module 164 may modify the suggest text (e.g., to conform to the text the user has been entering in place of the previous suggested text). For instance, as shown in user interface 113C, when the user is composing second electronic message 114B, which is addressed to jackie@example.com, prediction module 164 may predict the text "Hey Jackie" as opposed to "Hi Jackie".

An electronic message may have multiple recipients (i.e., may be addressed to multiple people). In such situations, prediction module 164 may receive identifications of each of the recipients and predict the text for the body of the electronic message based on past text used by the user in electronic messages addressed to that set of recipients. For example, as shown in user interface 113D, a user may be composing third electronic message 114C to jackie@example.com and ben@example.com. Based on the identities of the recipients (Jackie and Ben), prediction module 164 may predict the text "Hi Jackie and Ben" for body 116 of third electronic message 114C and the predicted text may be output for optional selection and insertion. Just like in the single recipient context, the user composing the electronic message may accept or reject the suggestion. As shown in user interface 113E, the user may reject the suggestion by providing user input including the text "Hey Team". Prediction module 164 may learn from the rejection and subsequent user input such that, at a future time when the user is composing fourth electronic message 114D to jackie@example.com and ben@example.com, prediction module 164 may predict the text "Hey Team" as opposed to "Hi Jackie and Ben".

By providing suggested text based on identification of recipients, an example computing system may improve usability of a messaging service. Such automation may promote more efficient user interactions with the example computing system thereby causing the example computing system to receive fewer false inputs or fewer inputs in general than other computing systems that do not selectively provide text suggestions in this way. The example computing system may therefore perform fewer operations (or, in other words, utilize fewer processor cycles) and may consume less electrical power and/or result in battery power savings, as compared to other computing systems. In addition, the example computing system may provide a less frustrating and more enjoyable user experience.

Throughout the disclosure, examples are described wherein a computing device and/or computing system may analyze information (e.g., e-mail, other communications, and the like) associated with the computing device the user of the computing device only if the computing device and/or the computing system receives explicit permission from the user of the computing device to analyze the information. For example, in situations discussed below in which the computing device and/or computing system may collect or may make use of communication information associated with the user and the computing device, the user may be provided with an opportunity to provide input to control whether programs or features of the computing device and/or computing system can collect and make use of user information (e.g., information about a user's e-mail, a user's social network, social actions or activities, profession, a user's preferences, or a user's past and current location), or to dictate whether and/or how the computing device and/or computing system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and/or computing system.

Figure 2:
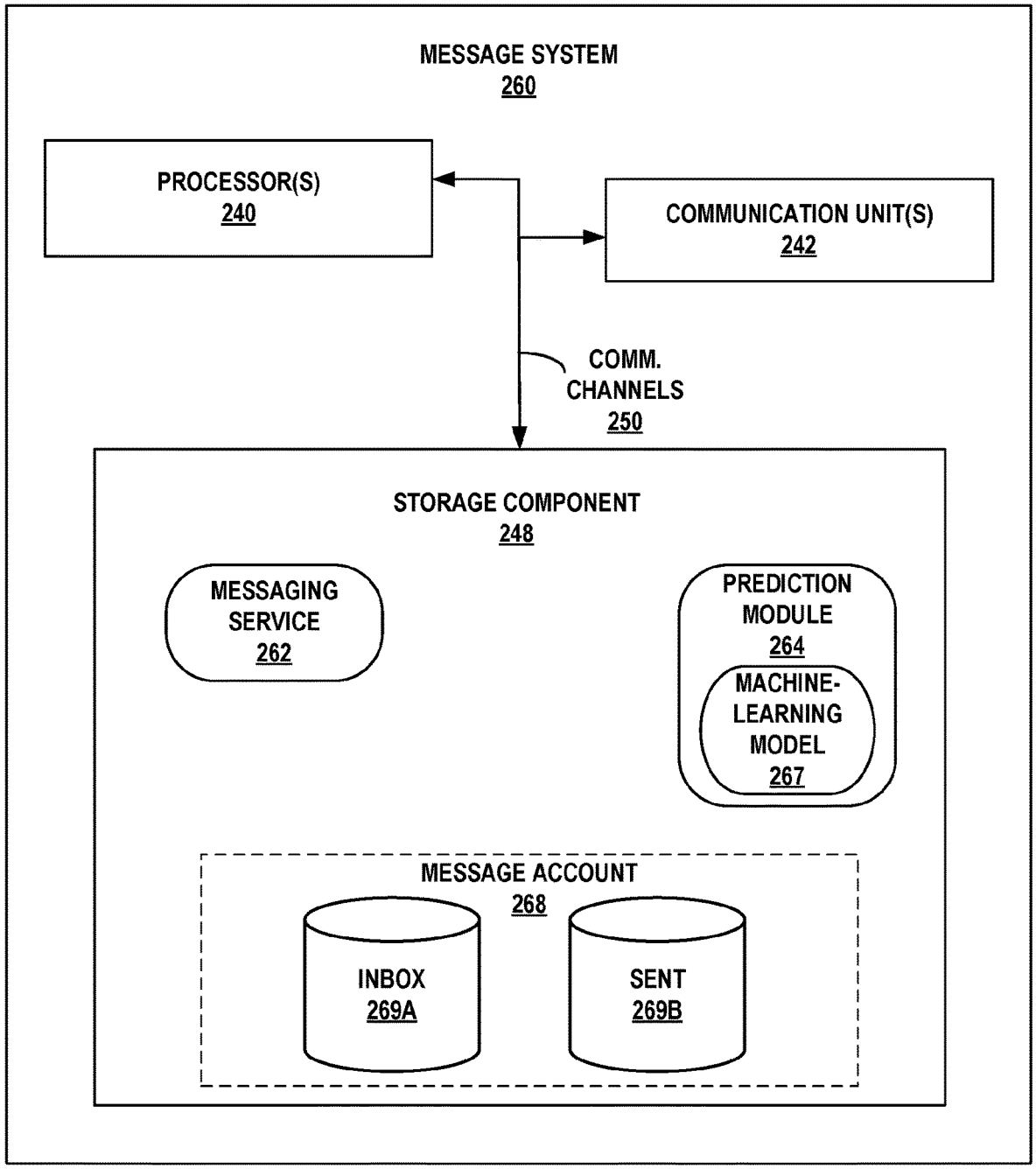
FIG. 2 is a block diagram illustrating an example computing system that is configured to provide predicted text suggestions to a user editing an electronic message, in accordance with one or more aspects of the present disclosure.

FIG. 2 is a block diagram illustrating an example computing system that is configured to selectively provide predicted text suggestions to a user editing an electronic message, in accordance with one or more aspects of the present disclosure Message system 260 of FIG. 2 is described below as an example of message system 160 of FIG. 1A. FIG. 2 illustrates only one particular example of message system 260, and many other examples of message system 260 may be used in other instances and may include a subset of the components included in message system 260 or may include additional components not shown in FIG. 2.

As shown in the example of FIG. 2, message system 260 include one or more processors 240, one or more communication units 242, and one or more storage components 248. Storage components 248 of message system 260 includes messaging service module 262, prediction module 264, topic module 266, and message account 268 which includes inbox 269A and sent box 269B. Prediction module 264 includes machine-learning (ML) model 267. Topic module 266 includes ML model 271.

Communication channels 250 interconnect each of the components 240, 242, and 248 for inter-component communications (physically, communicatively, and/or operatively). In some examples, communication channels 250 may include a system bus, a network connection, an inter-process communication data structure, or any other method for communicating data.

One or more communication units 242 communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more storage components 248 store information for processing during operation of message system 260. In some examples, storage component 248 is a temporary memory, meaning that a primary purpose of storage component 248 is not long-term storage. Storage components 248 on message system 260 may be configured for short-term storage of information as volatile memory and therefore not retain stored contents if powered off. Examples of volatile memories include random access memories (RAM), dynamic random-access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with message account 268, modules 262 and 264, and ML model 267. Storage components 248 may include a memory configured to store data or other information associated with message account 268, modules 262 and 264, and ML model 267.

One or more processors 240 may implement functionality and/or execute instructions associated with message system 260. Examples of processors 240 include application processors, display controllers, auxiliary processors, one or more sensor hubs, and any other hardware configure to function as a processor, a processing unit, or a processing device. Message account 268, modules 262 and 264, and ML model 267 may include instructions that are operable by processors 240 to perform various actions, operations, or functions of message system 260. For example, processors 240 may retrieve and execute instructions stored by storage components 248 that cause processors 240 to perform the operations described herein that are attributed to message account 268, modules 262 and 264, and ML model 267. The instructions, when executed by processors 240, may cause message system 260 to store information within storage components 248, for example, at message account 268.

Messaging service module 262 may include all functionality of messaging service module 162 of FIG. 1A and may perform similar operations as messaging service module 162 so as to configure message system 260 to provide a network-based messaging service. Messaging service module 262 processes electronic messages received via a network, such as network 130. Messaging service module 262 maintains message account 268 which is associated with a user of computing device 110. Messages received by messaging service module 262 that are addressed to message account 268 are stored in inbox 269A of message account 268. Whereas messages received by messaging service module 262 that are sent from message account 268 are stored in sent box 269B. Copies of message account 268 may be replicated and stored locally at other computing devices, such as computing device 110. That is, for any action that messaging service module 262 performs on message account 268, messaging service module 262 may cause a client (such as messaging client module 122) to perform a similar action to a copy of messaging account 268 that is stored elsewhere, and remote from message system 260.

Prediction module 264 may include all functionality of prediction module 164 of FIG. 1A and may perform similar operations as prediction module 164. As discussed above and in accordance with one or more techniques of this disclosure, prediction module 264 may automatically provide text suggestions for a body of an electronic message based on the recipients of the electronic message. Although shown and described as being part of a message system 260 which is a remote messaging system, some or all of prediction module 264 may reside locally at, and be executable from, a computing device, such as computing device 110 of FIG. 1A.

Prediction module 264 may use ML model 267 to generate candidate portions of text. For instance, prediction module 264 may provide ML model 267 with an identification of a recipient (or recipients) of a message currently being edited. Based on the identification of the recipient, ML model 267 may generate one or more candidate portions of text predicted for a body of the message.

In some examples, the candidate portions of text may include a greeting for the message. The greeting may or may not include a name of the recipient. For instance, where the name of the recipient is Charlie, the greeting may include the word (or a variation on) Charlie (e.g., "Hi Charlie", "Hello Charlie", "Sup Chuck", "Charlie", etc.) or may not include the word (or a variation on) Charlie (e.g., "Hi", "Hello", "Sup", "Heyyy", etc.) The greeting may or may not include one or more words other than a name or a salutation of the recipient.

ML model 267 may generate the greetings by calculating scores for a plurality of greetings in a greetings database. For instance, ML model 267 may generate a score for a first greeting (e.g., "Hi"), a score for a second greeting (e.g., "Hello"), a score for a third greeting (e.g., "Dear"), . . . and a score for an Nth greeting. Each of the scores may indicate a likelihood that their corresponding greeting will be accepted by the composer of the message. ML model 267 may select the greeting with the most favorable score (i.e., the greeting with the highest likelihood of being accepted by the composer of the message) as the candidate portion of text.

ML model 267 may calculate the scores using any suitable technique. As one example, ML model 267 may calculate the scores based on the frequency that the composer has used the greetings. For instance, ML model 267 may calculate a more favorable score for a greeting that the composer uses more frequently than for a greeting that the composer uses less frequently. As another example, ML model 267 may calculate the scores based on the recency with which the composer has used the greetings. For instance, ML model 267 may calculate a more favorable score for a greeting that the composer has used more recently than for a greeting that the composer used further in the past.

The frequency and/or recency metrics used by ML model 267 may be recipient based. As one example, ML model 267 may calculate a more favorable score for a greeting that the composer uses more frequently with the recipient of the message than for a greeting that the composer uses less frequently with the recipient of the message. As another example, ML model 267 may calculate a more favorable score for a greeting that the composer has used more recently with the recipient of the message than for a greeting that the composer used less recently with the recipient of the message.

In some examples, the candidate portions of text may include text other than a greeting for the message. For instance, if a user frequently begins messages addressed to a particular set of recipients with "Hi Team, Please remember to submit your TPS reports this week."

ML model 267 may be a machine-learned model (e.g., a neural network, a long-short-term memory model, or any other type of model). ML model 267 may develop rules or otherwise learn what text is typically used in bodies of messages (e.g., messages addressed to particular sets of recipients). With explicit permission previously obtained from users to make use of and analyze their electronic messages, the training corpus of text used to train ML model 267 may include the users' past electronic messages. Message system 260 further provides a way for users to withdraw consent to make use of and analyze their electronic messages and in response, message system 260 stop analyzing the messages of those that withdraw consent.

As discussed above, ML model 267 may generate the greetings by calculating scores for a plurality of greetings in a greetings database. ML model 267, or another component of system 100, may update or otherwise modify the entries in the greetings database. For instance, ML model 267 may analyze a message previously sent by the composer of the current message to identify the greeting used by the composer and update the database accordingly. As one example, if the identified greeting is already included in the database, ML model 267 may update one or more heuristics of the identified greeting (e.g., the frequency of use of the identified greeting, the recency of use of the identified greeting, etc.). As another example, if the identified greeting is not already included in the database, ML model 267 may create a new entry for the identified greeting in the database.

ML model 267 may periodically perform the database updating. For instance, ML model 267 may update the database based on additional messages sent by the composer at a particular temporal interval (e.g., daily, weekly, monthly, etc.) or after a certain number of messages sent by the composer (e.g., every one, five, ten, twenty, fifty messages, etc.).

Figure 3A:
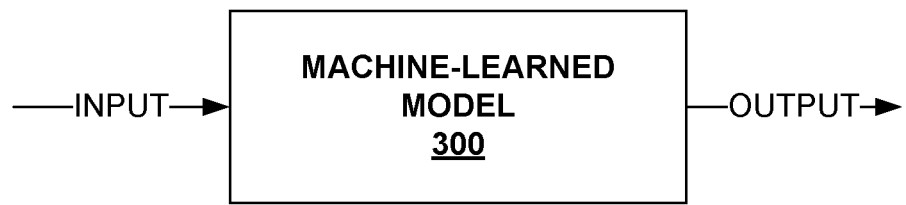
FIGS. 3A through 3E are conceptual diagrams illustrating aspects of an example machine-learned model according to example implementations of the present disclosure.

FIG. 3A depicts a conceptual diagram of an example machine-learned model according to example implementations of the present disclosure. As illustrated in FIG. 3A, in some implementations, machine-learned model 300 is trained to receive input data of one or more types and, in response, provide output data of one or more types. Thus, FIG. 3A illustrates machine-learned model 300 performing inference.

The input data may include one or more features that are associated with an instance or an example. In some implementations, the one or more features associated with the instance or example can be organized into a feature vector. In some implementations, the output data can include one or more predictions. Predictions can also be referred to as inferences. Thus, given features associated with a particular instance, machine-learned model 300 can output a prediction for such instance based on the features.

Machine-learned model 300 can be or include one or more of various different types of machine-learned models. In particular, in some implementations, machine-learned model 300 can perform classification, regression, clustering, anomaly detection, recommendation generation, and/or other tasks.

In some implementations, machine-learned model 300 can perform various types of classification based on the input data. For example, machine-learned model 300 can perform binary classification or multiclass classification. In binary classification, the output data can include a classification of the input data into one of two different classes. In multiclass classification, the output data can include a classification of the input data into one (or more) of more than two classes. The classifications can be single label or multi-label. Machine-learned model 300 may perform discrete categorical classification in which the input data is simply classified into one or more classes or categories.

In some implementations, machine-learned model 300 can perform classification in which machine-learned model 300 provides, for each of one or more classes, a numerical value descriptive of a degree to which it is believed that the input data should be classified into the corresponding class. In some instances, the numerical values provided by machine-learned model 300 can be referred to as "confidence scores" that are indicative of a respective confidence associated with classification of the input into the respective class. In some implementations, the confidence scores can be compared to one or more thresholds to render a discrete categorical prediction. In some implementations, only a certain number of classes (e.g., one) with the relatively largest confidence scores can be selected to render a discrete categorical prediction.

Machine-learned model 300 may output a probabilistic classification. For example, machine-learned model 300 may predict, given a sample input, a probability distribution over a set of classes. Thus, rather than outputting only the most likely class to which the sample input should belong, machine-learned model 300 can output, for each class, a probability that the sample input belongs to such class. In some implementations, the probability distribution over all possible classes can sum to one. In some implementations, a Softmax function, or other type of function or layer can be used to squash a set of real values respectively associated with the possible classes to a set of real values in the range (0, 1) that sum to one.

In some examples, the probabilities provided by the probability distribution can be compared to one or more thresholds to render a discrete categorical prediction. In some implementations, only a certain number of classes (e.g., one) with the relatively largest predicted probability can be selected to render a discrete categorical prediction.

In cases in which machine-learned model 300 performs classification, machine-learned model 300 may be trained using supervised learning techniques. For example, machine-learned model 300 may be trained on a training dataset that includes training examples labeled as belonging (or not belonging) to one or more classes. Further details regarding supervised training techniques are provided below in the descriptions of FIGS. 3B through 3E.

In some implementations, machine-learned model 300 can perform regression to provide output data in the form of a continuous numeric value. The continuous numeric value can correspond to any number of different metrics or numeric representations, including, for example, currency values, scores, or other numeric representations. As examples, machine-learned model 300 can perform linear regression, polynomial regression, or nonlinear regression. As examples, machine-learned model 300 can perform simple regression or multiple regression. As described above, in some implementations, a Softmax function or other function or layer can be used to squash a set of real values respectively associated with a two or more possible classes to a set of real values in the range (0, 1) that sum to one.

Machine-learned model 300 may perform various types of clustering. For example, machine-learned model 300 can identify one or more previously-defined clusters to which the input data most likely corresponds. Machine-learned model 300 may identify one or more clusters within the input data. That is, in instances in which the input data includes multiple objects, documents, or other entities, machine-learned model 300 can sort the multiple entities included in the input data into a number of clusters. In some implementations in which machine-learned model 300 performs clustering, machine-learned model 300 can be trained using unsupervised learning techniques.

Machine-learned model 300 may perform anomaly detection or outlier detection. For example, machine-learned model 300 can identify input data that does not conform to an expected pattern or other characteristic (e.g., as previously observed from previous input data). As examples, the anomaly detection can be used for fraud detection or system failure detection.

In some implementations, machine-learned model 300 can provide output data in the form of one or more recommendations. For example, machine-learned model 300 can be included in a recommendation system or engine. As an example, given input data that describes previous outcomes for certain entities (e.g., a score, ranking, or rating indicative of an amount of success or enjoyment), machine-learned model 300 can output a suggestion or recommendation of one or more additional entities that, based on the previous outcomes, are expected to have a desired outcome (e.g., elicit a score, ranking, or rating indicative of success or enjoyment). As one example, given input data descriptive of a context of a computing device, such as computing device 110 of FIG. 1, a message system, such as message system 160 of FIG. 1, can output a suggestion or recommendation of predicted text that a user may wish to insert into an electronic message.

Machine-learned model 300 may, in some cases, act as an agent within an environment. For example, machine-learned model 300 can be trained using reinforcement learning, which will be discussed in further detail below.

In some implementations, machine-learned model 300 can be a parametric model while, in other implementations, machine-learned model 300 can be a non-parametric model. In some implementations, machine-learned model 300 can be a linear model while, in other implementations, machine-learned model 300 can be a non-linear model.

As described above, machine-learned model 300 can be or include one or more of various different types of machine-learned models. Examples of such different types of machine-learned models are provided below for illustration. One or more of the example models described below can be used (e.g., combined) to provide the output data in response to the input data. Additional models beyond the example models provided below can be used as well.

In some implementations, machine-learned model 300 can be or include one or more classifier models such as, for example, linear classification models; quadratic classification models; etc. Machine-learned model 300 may be or include one or more regression models such as, for example, simple linear regression models; multiple linear regression models; logistic regression models; stepwise regression models; multivariate adaptive regression splines; locally estimated scatterplot smoothing models; etc.

In some examples, machine-learned model 300 can be or include one or more decision tree-based models such as, for example, classification and/or regression trees; iterative dichotomiser 3 decision trees; C4.5 decision trees; chi-squared automatic interaction detection decision trees; decision stumps; conditional decision trees; etc.

Machine-learned model 300 may be or include one or more kernel machines. In some implementations, machine-learned model 300 can be or include one or more support vector machines. Machine-learned model 300 may be or include one or more instance-based learning models such as, for example, learning vector quantization models; self-organizing map models; locally weighted learning models; etc. In some implementations, machine-learned model 300 can be or include one or more nearest neighbor models such as, for example, k-nearest neighbor classifications models; k-nearest neighbors regression models; etc. Machine-learned model 300 can be or include one or more Bayesian models such as, for example, naïve Bayes models; Gaussian naïve Bayes models; multinomial naïve Bayes models; averaged one-dependence estimators; Bayesian networks; Bayesian belief networks; hidden Markov models; etc.

In some implementations, machine-learned model 300 can be or include one or more artificial neural networks (also referred to simply as neural networks). A neural network can include a group of connected nodes, which also can be referred to as neurons or perceptrons. A neural network can be organized into one or more layers. Neural networks that include multiple layers can be referred to as "deep" networks. A deep network can include an input layer, an output layer, and one or more hidden layers positioned between the input layer and the output layer. The nodes of the neural network can be connected or non-fully connected.

Machine-learned model 300 can be or include one or more feed forward neural networks. In feed forward networks, the connections between nodes do not form a cycle. For example, each connection can connect a node from an earlier layer to a node from a later layer.

In some instances, machine-learned model 300 can be or include one or more recurrent neural networks. In some instances, at least some of the nodes of a recurrent neural network can form a cycle. Recurrent neural networks can be especially useful for processing input data that is sequential in nature. In particular, in some instances, a recurrent neural network can pass or retain information from a previous portion of the input data sequence to a subsequent portion of the input data sequence through the use of recurrent or directed cyclical node connections.

In some examples, sequential input data can include time-series data (e.g., sensor data versus time or imagery captured at different times). For example, a recurrent neural network can analyze sensor data versus time to detect or predict a swipe direction, to perform handwriting recognition, etc. Sequential input data may include words in a sentence (e.g., for natural language processing, speech detection or processing, etc.); notes in a musical composition; sequential actions taken by a user (e.g., to detect or predict sequential application usage); sequential object states; etc.

Example recurrent neural networks include long short-term (LSTM) recurrent neural networks; gated recurrent units; bi-direction recurrent neural networks; continuous time recurrent neural networks; neural history compressors; echo state networks; Elman networks; Jordan networks; recursive neural networks; Hopfield networks; fully recurrent networks; sequence-to-sequence configurations; etc.

In some implementations, machine-learned model 300 can be or include one or more convolutional neural networks. In some instances, a convolutional neural network can include one or more convolutional layers that perform convolutions over input data using learned filters.

Filters can also be referred to as kernels. Convolutional neural networks can be especially useful for vision problems such as when the input data includes imagery such as still images or video. However, convolutional neural networks can also be applied for natural language processing.

In some examples, machine-learned model 300 can be or include one or more generative networks such as, for example, generative adversarial networks. Generative networks can be used to generate new data such as new images or other content.

Machine-learned model 300 may be or include an autoencoder. In some instances, the aim of an autoencoder is to learn a representation (e.g., a lower-dimensional encoding) for a set of data, typically for the purpose of dimensionality reduction. For example, in some instances, an autoencoder can seek to encode the input data and the provide output data that reconstructs the input data from the encoding. Recently, the autoencoder concept has become more widely used for learning generative models of data. In some instances, the autoencoder can include additional losses beyond reconstructing the input data.

Machine-learned model 300 may be or include one or more other forms of artificial neural networks such as, for example, deep Boltzmann machines; deep belief networks; stacked autoencoders; etc. Any of the neural networks described herein can be combined (e.g., stacked) to form more complex networks.

One or more neural networks can be used to provide an embedding based on the input data. For example, the embedding can be a representation of knowledge abstracted from the input data into one or more learned dimensions. In some instances, embeddings can be a useful source for identifying related entities. In some instances, embeddings can be extracted from the output of the network, while in other instances embeddings can be extracted from any hidden node or layer of the network (e.g., a close to final but not final layer of the network). Embeddings can be useful for performing auto suggest next video, product suggestion, entity or object recognition, etc. In some instances, embeddings be useful inputs for downstream models. For example, embeddings can be useful to generalize input data (e.g., search queries) for a downstream model or processing system.

Machine-learned model 300 may include one or more clustering models such as, for example, k-means clustering models; k-medians clustering models; expectation maximization models; hierarchical clustering models; etc.

In some implementations, machine-learned model 300 can perform one or more dimensionality reduction techniques such as, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, machine-learned model 300 can perform or be subjected to one or more reinforcement learning techniques such as Markov decision processes; dynamic programming; Q functions or Q-learning; value function approaches; deep Q-networks; differentiable neural computers; asynchronous advantage actor-critics; deterministic policy gradient; etc.

In some implementations, machine-learned model 300 can be an autoregressive model. In some instances, an autoregressive model can specify that the output data depends linearly on its own previous values and on a stochastic term. In some instances, an autoregressive model can take the form of a stochastic difference equation. One example autoregressive model is WaveNet, which is a generative model for raw audio.

In some implementations, machine-learned model 300 can include or form part of a multiple model ensemble. As one example, bootstrap aggregating can be performed, which can also be referred to as "bagging." In bootstrap aggregating, a training dataset is split into a number of subsets (e.g., through random sampling with replacement) and a plurality of models are respectively trained on the number of subsets. At inference time, respective outputs of the plurality of models can be combined (e.g., through averaging, voting, or other techniques) and used as the output of the ensemble.

One example ensemble is a random forest, which can also be referred to as a random decision forest. Random forests are an ensemble learning method for classification, regression, and other tasks. Random forests are generated by producing a plurality of decision trees at training time. In some instances, at inference time, the class that is the mode of the classes (classification) or the mean prediction (regression) of the individual trees can be used as the output of the forest. Random decision forests can correct for decision trees' tendency to overfit their training set.

Another example ensemble technique is stacking, which can, in some instances, be referred to as stacked generalization. Stacking includes training a combiner model to blend or otherwise combine the predictions of several other machine-learned models. Thus, a plurality of machine-learned models (e.g., of same or different type) can be trained based on training data. In addition, a combiner model can be trained to take the predictions from the other machine-learned models as inputs and, in response, produce a final inference or prediction. In some instances, a single-layer logistic regression model can be used as the combiner model.

Another example ensemble technique is boosting. Boosting can include incrementally building an ensemble by iteratively training weak models and then adding to a final strong model. For example, in some instances, each new model can be trained to emphasize the training examples that previous models misinterpreted (e.g., misclassified). For example, a weight associated with each of such misinterpreted examples can be increased. One common implementation of boosting is AdaBoost, which can also be referred to as Adaptive Boosting. Other example boosting techniques include LPBoost; TotalBoost; BrownBoost; xgboost; MadaBoost, LogitBoost, gradient boosting; etc. Furthermore, any of the models described above (e.g., regression models and artificial neural networks) can be combined to form an ensemble. As an example, an ensemble can include a top-level machine-learned model or a heuristic function to combine and/or weight the outputs of the models that form the ensemble.

In some implementations, multiple machine-learned models (e.g., that form an ensemble can be linked and trained jointly (e.g., through backpropagation of errors sequentially through the model ensemble). However, in some implementations, only a subset (e.g., one) of the jointly trained models is used for inference.

In some implementations, machine-learned model 300 can be used to preprocess the input data for subsequent input into another model. For example, machine-learned model 300 can perform dimensionality reduction techniques and embeddings (e.g., matrix factorization, principal components analysis, singular value decomposition, word2vec/GLOVE, and/or related approaches); clustering; and even classification and regression for downstream consumption. Many of these techniques have been discussed above and will be further discussed below.

As discussed above, machine-learned model 300 can be trained or otherwise configured to receive the input data and, in response, provide the output data. The input data can include different types, forms, or variations of input data. As examples, in various implementations, the input data can include features that describe the content (or portion of content) initially selected by the user, e.g., content of user-selected document or image, links pointing to the user selection, links within the user selection relating to other files available on device or cloud, metadata of user selection, etc. Additionally, with user permission, the input data includes the context of user usage, either obtained from app itself or from other sources. Examples of usage context include breadth of share (sharing publicly, or with a large group, or privately, or a specific person), context of share, etc. When permitted by the user, additional input data can include the state of the device, e.g., the location of the device, the apps running on the device, etc.

In some implementations, machine-learned model 300 can receive and use the input data in its raw form. In some implementations, the raw input data can be preprocessed. Thus, in addition or alternatively to the raw input data, machine-learned model 300 can receive and use the preprocessed input data.

In some implementations, preprocessing the input data can include extracting one or more additional features from the raw input data. For example, feature extraction techniques can be applied to the input data to generate one or more new, additional features. Example feature extraction techniques include edge detection; corner detection; blob detection; ridge detection; scale-invariant feature transform; motion detection; optical flow; Hough transform; etc.

In some implementations, the extracted features can include or be derived from transformations of the input data into other domains and/or dimensions. As an example, the extracted features can include or be derived from transformations of the input data into the frequency domain. For example, wavelet transformations and/or fast Fourier transforms can be performed on the input data to generate additional features.

In some implementations, the extracted features can include statistics calculated from the input data or certain portions or dimensions of the input data. Example statistics include the mode, mean, maximum, minimum, or other metrics of the input data or portions thereof.

In some implementations, as described above, the input data can be sequential in nature. In some instances, the sequential input data can be generated by sampling or otherwise segmenting a stream of input data. As one example, frames can be extracted from a video. In some implementations, sequential data can be made non-sequential through summarization.

As another example preprocessing technique, portions of the input data can be imputed. For example, additional synthetic input data can be generated through interpolation and/or extrapolation.

As another example preprocessing technique, some or all of the input data can be scaled, standardized, normalized, generalized, and/or regularized. Example regularization techniques include ridge regression; least absolute shrinkage and selection operator (LASSO); elastic net; least-angle regression; cross-validation; L1 regularization; L2 regularization; etc. As one example, some or all of the input data can be normalized by subtracting the mean across a given dimension's feature values from each individual feature value and then dividing by the standard deviation or other metric.

As another example preprocessing technique, some or all or the input data can be quantized or discretized. In some cases, qualitative features or variables included in the input data can be converted to quantitative features or variables. For example, one hot encoding can be performed.

In some examples, dimensionality reduction techniques can be applied to the input data prior to input into machine-learned model 300. Several examples of dimensionality reduction techniques are provided above, including, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, during training, the input data can be intentionally deformed in any number of ways to increase model robustness, generalization, or other qualities. Example techniques to deform the input data include adding noise; changing color, shade, or hue; magnification; segmentation; amplification; etc.

In response to receipt of the input data, machine-learned model 300 can provide the output data. The output data can include different types, forms, or variations of output data. As examples, in various implementations, the output data can include content, either stored locally on the user device or in the cloud, that is relevantly shareable along with the initial content selection.

As discussed above, in some implementations, the output data can include various types of classification data (e.g., binary classification, multiclass classification, single label, multi-label, discrete classification, regressive classification, probabilistic classification, etc.) or can include various types of regressive data (e.g., linear regression, polynomial regression, nonlinear regression, simple regression, multiple regression, etc.). In other instances, the output data can include clustering data, anomaly detection data, recommendation data, or any of the other forms of output data discussed above.

In some implementations, the output data can influence downstream processes or decision making. As one example, in some implementations, the output data can be interpreted and/or acted upon by a rules-based regulator.

The present disclosure provides systems and methods that include or otherwise leverage one or more machine-learned models to suggest content, either stored locally on the uses device or in the cloud, that is relevantly shareable along with the initial content selection based on features of the initial content selection. Any of the different types or forms of input data described above can be combined with any of the different types or forms of machine-learned models described above to provide any of the different types or forms of output data described above.

The systems and methods of the present disclosure can be implemented by or otherwise executed on one or more computing devices. Example computing devices include user computing devices (e.g., laptops, desktops, and mobile computing devices such as tablets, smartphones, wearable computing devices, etc.); embedded computing devices (e.g., devices embedded within a vehicle, camera, image sensor, industrial machine, satellite, gaming console or controller, or home appliance such as a refrigerator, thermostat, energy meter, home energy manager, smart home assistant, etc.); server computing devices (e.g., database servers, parameter servers, file servers, mail servers, print servers, web servers, game servers, application servers, etc.); dedicated, specialized model processing or training devices; virtual computing devices; other computing devices or computing infrastructure; or combinations thereof.

Figure 3B:
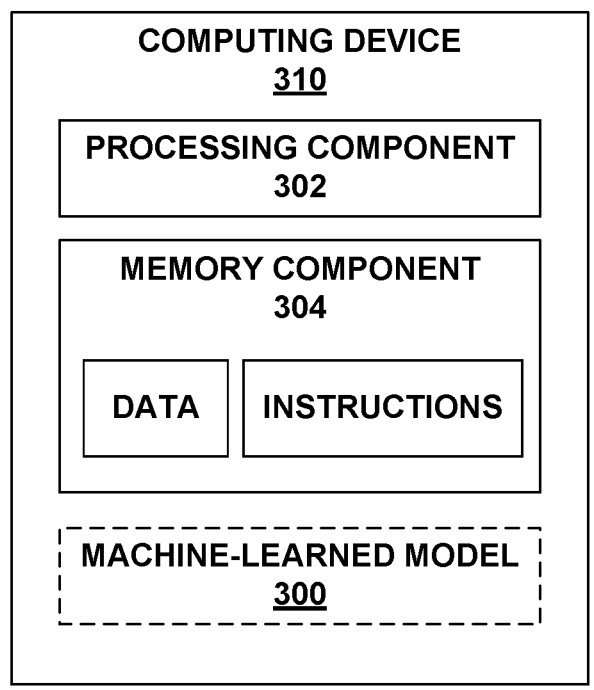

FIG. 3B illustrates a conceptual diagram of computing device 310, which is an example of message system 260 of FIG. 2. Computing device 310 includes processing component 302, memory component 304 and machine-learned model 300. Computing device 310 may store and implement machine-learned model 300 locally (i.e., on-device). Thus, in some implementations, machine-learned model 300 can be stored at and/or implemented locally by an embedded device or a user computing device such as a mobile device. Output data obtained through local implementation of machine-learned model 300 at the embedded device or the user computing device can be used to improve performance of the embedded device or the user computing device (e.g., an application implemented by the embedded device or the user computing device).

Figure 3C:
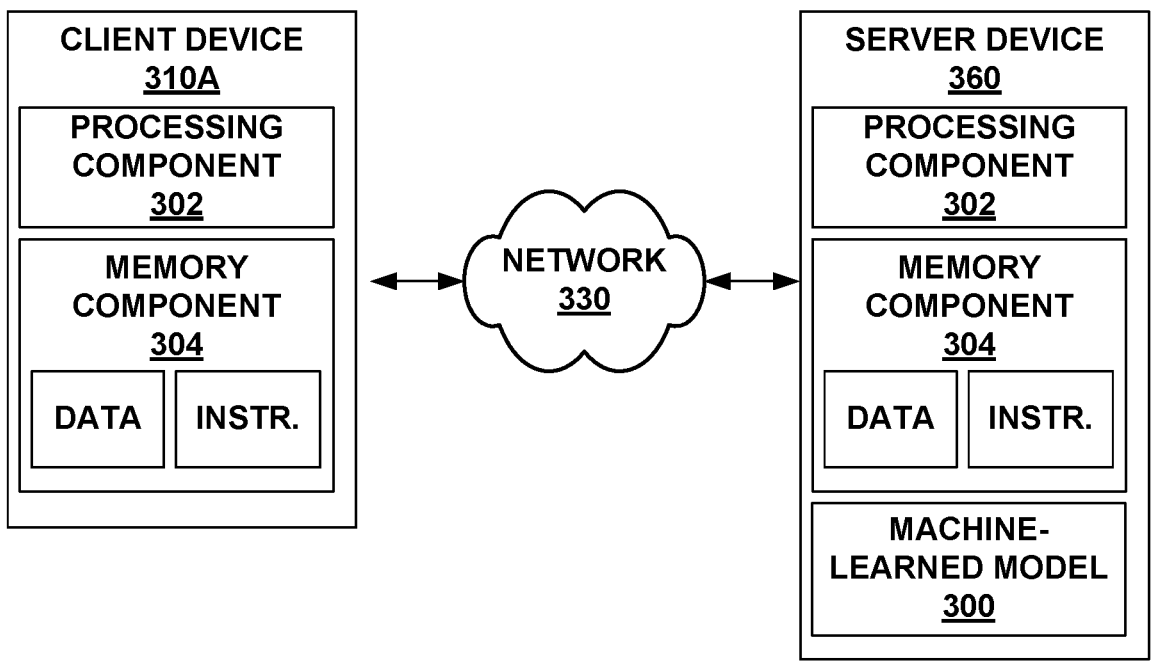

FIG. 3C illustrates a conceptual diagram of an example client computing device that can communicate over a network with an example server computing system that includes a machine-learned model. FIG. 3C includes client device 310A communicating with server device 360 over network 330. Client device 310A is an example of computing device 110 of FIG. 1, server device 360 is an example of message system 160 of FIG. 1 and message system 260 of FIG. 2, and network 330 is an example of network 130 of FIG. 1. Server device 360 stores and implements machine-learned model 300. In some instances, output data obtained through machine-learned model 300 at server device 360 can be used to improve other server tasks or can be used by other non-user devices to improve services performed by or for such other non-user devices. For example, the output data can improve other downstream processes performed by server device 360 for a computing device of a user or embedded computing device. In other instances, output data obtained through implementation of machine-learned model 300 at server device 360 can be sent to and used by a user computing device, an embedded computing device, or some other client device, such as client device 310A. For example, server device 360 can be said to perform machine learning as a service.

In yet other implementations, different respective portions of machine-learned model 300 can be stored at and/or implemented by some combination of a user computing device; an embedded computing device; a server computing device; etc. In other words, portions of machine-learned model 300 may be distributed in whole or in part amongst client device 310A and server device 360.

Devices 310A and 360 may perform graph processing techniques or other machine learning techniques using one or more machine learning platforms, frameworks, and/or libraries, such as, for example, TensorFlow, Caffe/Caffe2, Theano, Torch/PyTorch, MXnet, CNTK, etc. Devices 310A and 360 may be distributed at different physical locations and connected via one or more networks, including network 330. If configured as distributed computing devices, Devices 310A and 360 may operate according to sequential computing architectures, parallel computing architectures, or combinations thereof. In one example, distributed computing devices can be controlled or guided through use of a parameter server.

In some implementations, multiple instances of machine-learned model 300 can be parallelized to provide increased processing throughput. For example, the multiple instances of machine-learned model 300 can be parallelized on a single processing device or computing device or parallelized across multiple processing devices or computing devices.

Each computing device that implements machine-learned model 300 or other aspects of the present disclosure can include a number of hardware components that enable performance of the techniques described herein. For example, each computing device can include one or more memory devices that store some or all of machine-learned model 300. For example, machine-learned model 300 can be a structured numerical representation that is stored in memory. The one or more memory devices can also include instructions for implementing machine-learned model 300 or performing other operations. Example memory devices include RAM, ROM, EEPROM, EPROM, flash memory devices, magnetic disks, etc., and combinations thereof.

Each computing device can also include one or more processing devices that implement some or all of machine-learned model 300 and/or perform other related operations. Example processing devices include one or more of: a central processing unit (CPU); a visual processing unit (VPU); a graphics processing unit (GPU); a tensor processing unit (TPU); a neural processing unit (NPU); a neural processing engine; a core of a CPU, VPU, GPU, TPU, NPU or other processing device; an application specific integrated circuit (ASIC); a field programmable gate array (FPGA); a co-processor; a controller; or combinations of the processing devices described above. Processing devices can be embedded within other hardware components such as, for example, an image sensor, accelerometer, etc.

Hardware components (e.g., memory devices and/or processing devices) can be spread across multiple physically distributed computing devices and/or virtually distributed computing systems.

Figure 3D:
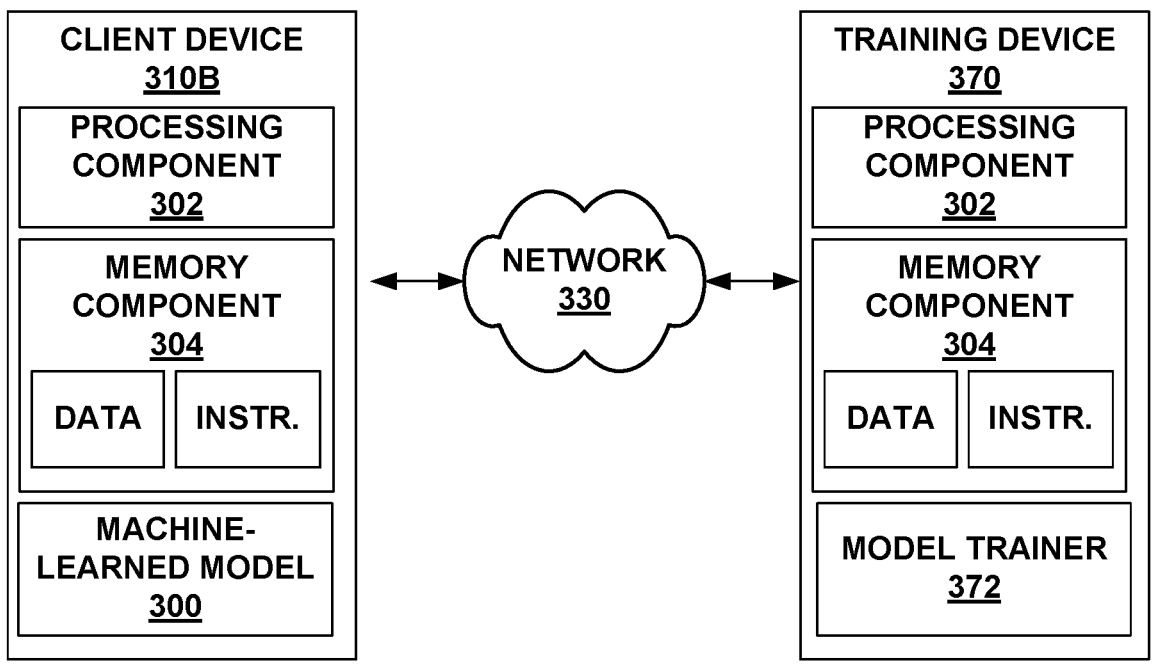

FIG. 3D illustrates a conceptual diagram of an example computing device in communication with an example training computing system that includes a model trainer. FIG. 3D includes client device 310B communicating with training device 370 over network 330. Client device 310B is an example of computing device 110 of FIG. 1 and network 330 is an example of network 130 of FIG. 1. Machine-learned model 300 described herein can be trained at a training computing system, such as training device 370, and then provided for storage and/or implementation at one or more computing devices, such as client device 310B. For example, model trainer 372 executes locally at training device 370. However in some examples, training device 370, including model trainer 372, can be included in or separate from client device 310B or any other computing device that implement machine-learned model 300.

In some implementations, machine-learned model 300 may be trained in an offline fashion or an online fashion. In offline training (also known as batch learning), machine-learned model 300 is trained on the entirety of a static set of training data. In online learning, machine-learned model 300 is continuously trained (or re-trained) as new training data becomes available (e.g., while the model is used to perform inference).

Model trainer 372 may perform centralized training of machine-learned model 300 (e.g., based on a centrally stored dataset). In other implementations, decentralized training techniques such as distributed training, federated learning, or the like can be used to train, update, or personalize machine-learned model 300.

Machine-learned model 300 described herein can be trained according to one or more of various different training types or techniques. For example, in some implementations, machine-learned model 300 can be trained by model trainer 372 using supervised learning, in which machine-learned model 300 is trained on a training dataset that includes instances or examples that have labels. The labels can be manually applied by experts, generated through crowd-sourcing, or provided by other techniques (e.g., by physics-based or complex mathematical models). In some implementations, if the user has provided consent, the training examples can be provided by the user computing device. In some implementations, this process can be referred to as personalizing the model.

Figure 3E:
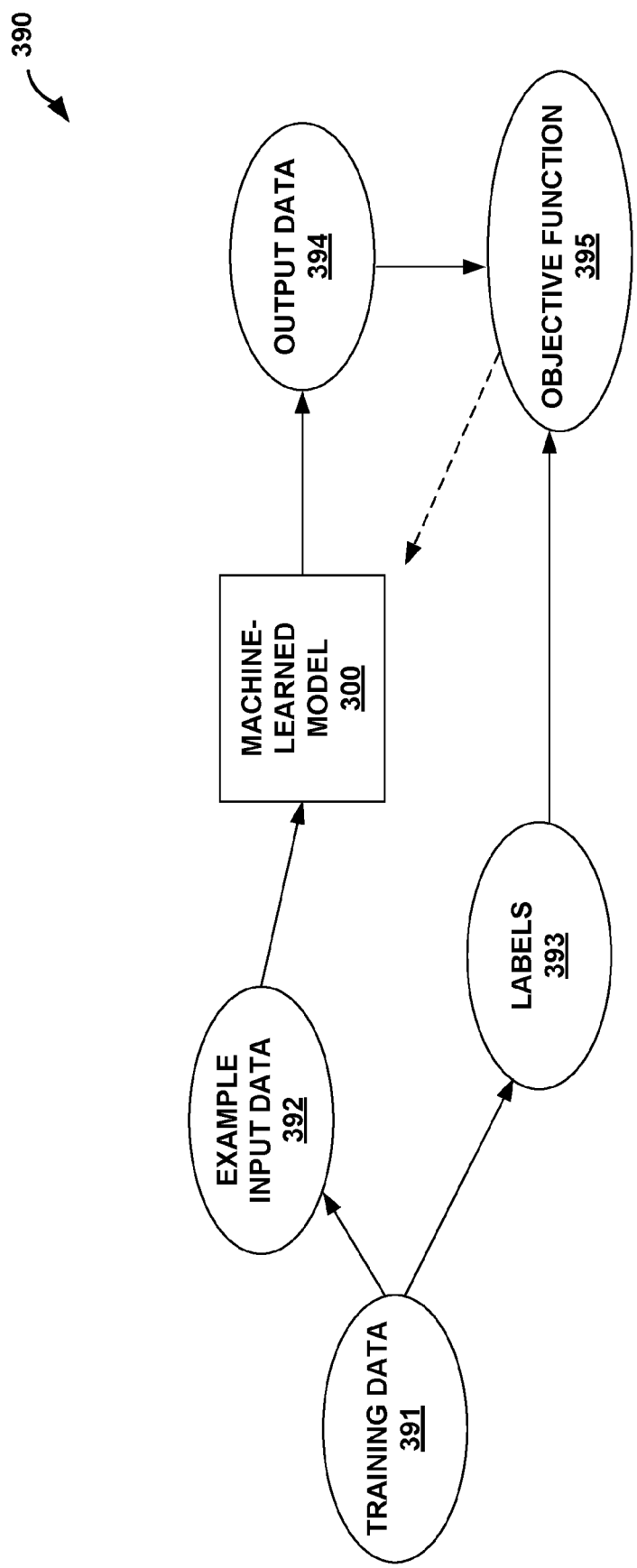

FIG. 3E illustrates a conceptual diagram of training process 390 which is an example training process in which machine-learned model 300 is trained on training data 391 that includes example input data 392 that has labels 393. Training processes 390 is one example training process; other training processes may be used as well.

Training data 391 used by training process 390 can include, upon user permission for use of such data for training, anonymized usage logs of sharing flows, e.g., content items that were shared together, bundled content pieces already identified as belonging together, e.g., from entities in a knowledge graph, etc. In some implementations, training data 391 can include examples of input data 392 that have been assigned labels 393 that correspond to output data 394.

In some implementations, machine-learned model 300 can be trained by optimizing an objective function, such as objective function 395. For example, in some implementations, objective function 395 may be or include a loss function that compares (e.g., determines a difference between) output data generated by the model from the training data and labels (e.g., ground-truth labels) associated with the training data. For example, the loss function can evaluate a sum or mean of squared differences between the output data and the labels. In some examples, objective function 395 may be or include a cost function that describes a cost of a certain outcome or output data. Other examples of objective function 395 can include margin-based techniques such as, for example, triplet loss or maximum-margin training.

One or more of various optimization techniques can be performed to optimize objective function 395. For example, the optimization technique(s) can minimize or maximize objective function 395. Example optimization techniques include Hessian-based techniques and gradient-based techniques, such as, for example, coordinate descent; gradient descent (e.g., stochastic gradient descent); subgradient methods; etc. Other optimization techniques include black box optimization techniques and heuristics.

In some implementations, backward propagation of errors can be used in conjunction with an optimization technique (e.g., gradient based techniques) to train machine-learned model 300 (e.g., when machine-learned model is a multi-layer model such as an artificial neural network). For example, an iterative cycle of propagation and model parameter (e.g., weights) update can be performed to train machine-learned model 300. Example backpropagation techniques include truncated backpropagation through time, Levenberg-Marquardt backpropagation, etc.

In some implementations, machine-learned model 300 described herein can be trained using unsupervised learning techniques. Unsupervised learning can include inferring a function to describe hidden structure from unlabeled data. For example, a classification or categorization may not be included in the data. Unsupervised learning techniques can be used to produce machine-learned models capable of performing clustering, anomaly detection, learning latent variable models, or other tasks.

Machine-learned model 300 can be trained using semi-supervised techniques which combine aspects of supervised learning and unsupervised learning. Machine-learned model 300 can be trained or otherwise generated through evolutionary techniques or genetic algorithms. In some implementations, machine-learned model 300 described herein can be trained using reinforcement learning. In reinforcement learning, an agent (e.g., model) can take actions in an environment and learn to maximize rewards and/or minimize penalties that result from such actions. Reinforcement learning can differ from the supervised learning problem in that correct input/output pairs are not presented, nor suboptimal actions explicitly corrected.

In some implementations, one or more generalization techniques can be performed during training to improve the generalization of machine-learned model 300. Generalization techniques can help reduce overfitting of machine-learned model 300 to the training data. Example generalization techniques include dropout techniques; weight decay techniques; batch normalization; early stopping; subset selection; stepwise selection; etc.

In some implementations, machine-learned model 300 described herein can include or otherwise be impacted by a number of hyperparameters, such as, for example, learning rate, number of layers, number of nodes in each layer, number of leaves in a tree, number of clusters; etc. Hyperparameters can affect model performance. Hyperparameters can be hand selected or can be automatically selected through application of techniques such as, for example, grid search; black box optimization techniques (e.g., Bayesian optimization, random search, etc.); gradient-based optimization; etc. Example techniques and/or tools for performing automatic hyperparameter optimization include Hyperopt; Auto-WEKA; Spearmint; Metric Optimization Engine (MOE); etc.

In some implementations, various techniques can be used to optimize and/or adapt the learning rate when the model is trained. Example techniques and/or tools for performing learning rate optimization or adaptation include Adagrad; Adaptive Moment Estimation (ADAM); Adadelta; RMSprop; etc.

In some implementations, transfer learning techniques can be used to provide an initial model from which to begin training of machine-learned model 300 described herein.

In some implementations, machine-learned model 300 described herein can be included in different portions of computer-readable code on a computing device. In one example, machine-learned model 300 can be included in a particular application or program and used (e.g., exclusively) by such particular application or program. Thus, in one example, a computing device can include a number of applications and one or more of such applications can contain its own respective machine learning library and machine-learned model(s).

In another example, machine-learned model 300 described herein can be included in an operating system of a computing device (e.g., in a central intelligence layer of an operating system) and can be called or otherwise used by one or more applications that interact with the operating system. In some implementations, each application can communicate with the central intelligence layer (and model(s) stored therein) using an application programming interface (API) (e.g., a common, public API across all applications).

In some implementations, the central intelligence layer can communicate with a central device data layer. The central device data layer can be a centralized repository of data for the computing device. The central device data layer can communicate with a number of other components of the computing device, such as, for example, one or more sensors, a context manager, a device state component, and/or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination.

Databases and applications can be implemented on a single system or distributed across multiple systems. Distributed components can operate sequentially or in parallel.

In addition, the machine learning techniques described herein are readily interchangeable and combinable. Although certain example techniques have been described, many others exist and can be used in conjunction with aspects of the present disclosure.

A brief overview of example machine-learned models and associated techniques has been provided by the present disclosure. For additional details, readers should review the following references: Machine Learning A Probabilistic Perspective (Murphy); Rules of Machine Learning: Best Practices for ML Engineering (Zinkevich); Deep Learning (Goodfellow); Reinforcement Learning: An Introduction (Sutton); and Artificial Intelligence: A Modern Approach (Norvig).

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 4:
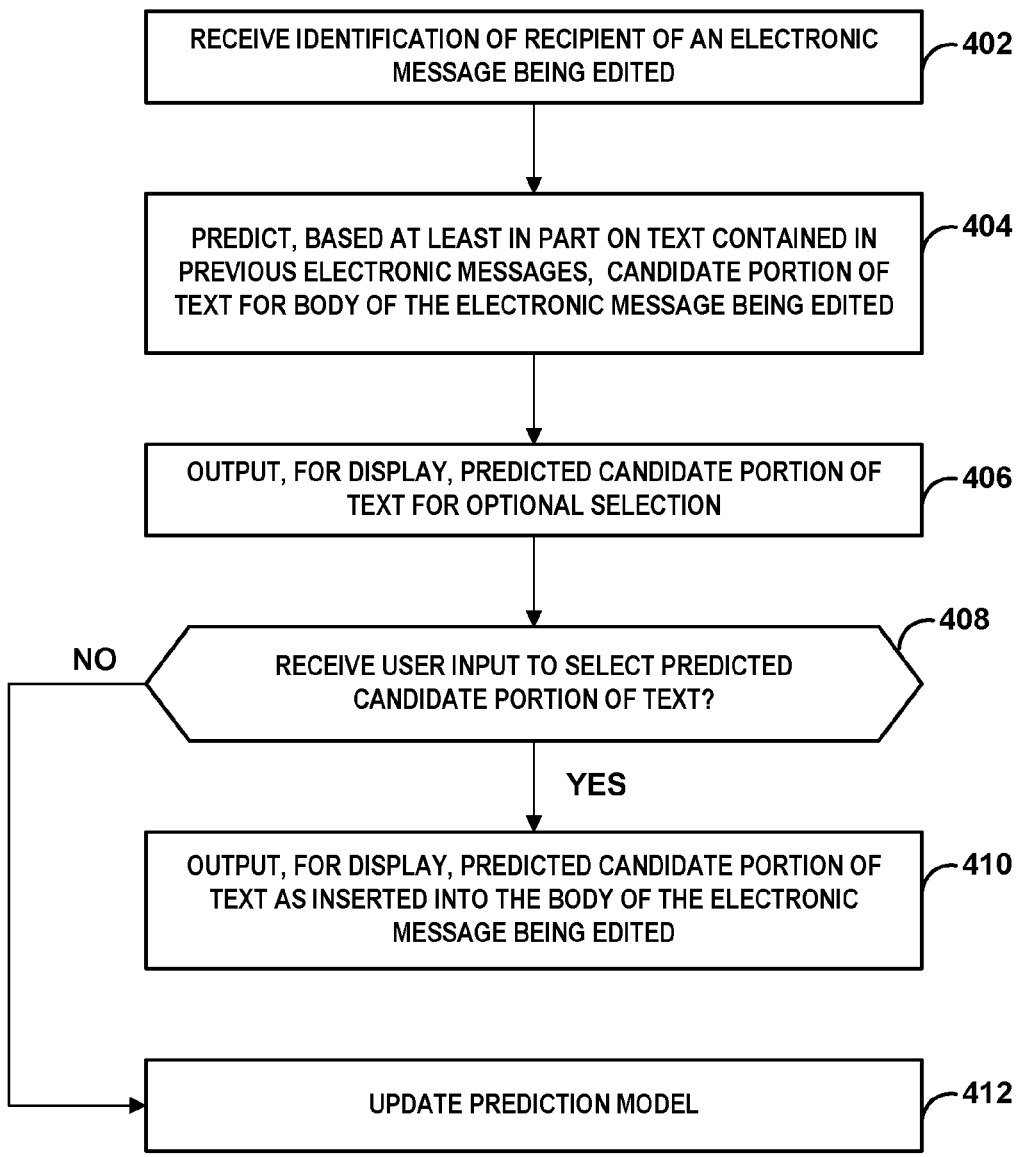
FIG. 4 is a flowchart illustrating example operations performed by an example computing system that is configured to provide predicted text suggestions to a user editing an electronic message, in accordance with one or more aspects of the present disclosure.

FIG. 4 is a flowchart illustrating example operations performed by an example computing system that is configured to provide predicted text suggestions to a user editing an electronic message based on text included in previous electronic messages, in accordance with one or more aspects of the present disclosure. FIG. 4 is described below in the context of system 100 of FIGS. 1A and 1B.

In accordance with techniques of this disclosure, system 100 may receive an identification of a recipient of an electronic message being edited (402). For example, messaging service module 262 may receive, from messaging client module 122, an email address, user name, real name, or other identification of addressees of the electronic message being edited by a user associated with a message account. In some examples, messaging service module 262 may receive the identification of the recipient before receiving user input associated with composition of a body of the electronic message being edited.

System 100 may predict, based at least in part on text contained in previous electronic messages sent from the message account, a candidate portion of text for a body of the electronic message being edited (404). For example, prediction module 164 may invoke a machine learning model (e.g., ML model 267 of FIG. 2) to generate one or more candidate portions of text for the body. As discussed above, prediction module 164 may generate the candidate portions of text based on text in electronic messages that were addressed to: the identified recipient, persons (e.g., accounts) other than the identified recipient, or to both identified recipient and persons other than the identified recipient.

System 100 may output, for display, the predicted candidate portion of text for optional selection (406). For instance, messaging client 122 may cause user interface component 112 to output user interface 113A that includes precited text "Hi Jackie" for optional selection to insert into body 116. As discussed above, messaging client 122 may convey that the text is for optional selection by formatting the text differently than user entered text.

System 100 may determine whether user input to select the predicted candidate portion of text (408). For instance, messaging client 122 may determine whether user interface component 122 has received user input to select the predicted candidate portion of text.

If system 100 receives user input to select the predicted candidate portion of text (408, YES branch), system 100 may output, for display, the predicted candidate portion of text as inserted into the body of the electronic message being edited (410). For instance, messaging client 122 may cause user interface component 112 to output a user interface with the predicted candidate portion of text formatted as user entered text.

If system 100 does not receive user input to select the predicted candidate portion of text (408, NO branch), system 100 may update a prediction model used to predict the candidate portion of text (412). For instance, prediction module 264 may further train ML model 267 based on text entered by the user in place of the predicted text.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
receiving, by a computing system, an identification of a recipient of a first electronic message being composed from a message account associated with a user;
predicting, by the computing system and based on text contained in previous electronic messages sent from the message account, first text for a body of the first electronic message, wherein predicting the first text comprises predicting the first text using a machine learning model trained based on text contained in the previous electronic messages sent from the message account that were addressed to the recipient;
outputting, for display and at a first time, the first predicted text for optional selection and insertion into the body of the first electronic message;
receiving, at a second time that is after the first time, user input to not insert the first predicted text into the body of the first electronic message;

updating, at a third time that is after the second time and based on the user input to not insert the first predicted text into the body of the first electronic message, the machine learning model to generate an updated machine learning model;

predicting, based on text contained in previous electronic messages sent from the message account and using the updated machine learning model, second predicted text for a body of a subsequent electronic message to the recipient, wherein the second predicted text is different than the first predicted text; and outputting, for display, the second predicted text for optional selection and insertion into the body of the subsequent electronic message.

2. The method of claim 1, wherein receiving the identification of the recipient of the electronic message being composed comprises receiving identifications of a plurality of recipients of the electronic message being composed, and wherein predicting the text comprises predicting the text based on past text used by the user in electronic messages addressed to the plurality of recipients.

3. The method of claim 1, wherein predicting the text for the body of the electronic message comprises:

predicting, by the computing system and based on greetings contained in previous electronic messages sent from the message account, a greeting for the body of the electronic message.

4. The method of claim 3, wherein predicting the greeting for the body of the electronic message comprises predicting, by the computing system and based on greetings contained in previous electronic messages sent from the message account that were addressed to the recipient, the greeting for the body of the electronic message.

5. The method of claim 3, further comprising:

identifying, by the computing system and using a machine learning model, the greetings contained in the previous electronic messages sent from the message account.

6. The method of claim 3, wherein the predicted greeting does not include a name of the recipient.

7. The method of claim 3, wherein the predicted greeting includes one or more words other than a name or a salutation of the recipient.

8. The method of claim 3, wherein the greeting is further predicted based on a domain of an e-mail address of the recipient.

9. The method of claim 3, wherein outputting the predicted greeting comprises outputting the predicted greeting before receiving user input associated with composition of a body of the electronic message being composed.

10. The method of claim 1, wherein updating the machine learning model based on the user input to not insert the first predicted text to generate an updated machine learning model comprises updating the machine learning model based on text entered in place of the first predicted text.

11. The method of claim 1, wherein outputting the predicted text for optional selection and insertion into the body of the electronic message comprises:

outputting, in-line with user entered text and with different formatting than the user entered text, the predicted text.

12. A computing system comprising:

one or more user interface components configured to receive typed user input; and one or more processors configured to:

receive an identification of a recipient of a first electronic message being composed from a message account associated with a user;

predict, based on text contained in previous electronic messages sent from the message account and using a machine learning model trained based on text contained in the previous electronic messages sent from the message account that were addressed to the recipient, first text for a body of the first electronic message;

output, for display and at a first time, the first predicted text for optional selection and insertion into the body of the first electronic message;

receive, at a second time that is after the first time, user input to not insert the first predicted text into the body of the first electronic message;

update, at a third time that is after the second time and based on the user input to not insert the first predicted text was selected for insertion into the body of the first electronic message, the machine learning model to generate an updated machine learning model;

predict, based on text contained in previous electronic messages sent from the message account and using the updated machine learning model, second predicted text for a body of a subsequent electronic message to the recipient, wherein the second predicted text is different than the first predicted text; and output, for display, the second predicted text for optional selection and insertion into the body of the subsequent electronic message.

13. The computing system of claim 12, wherein, to predict the text for the body of the electronic message, the one or more processors are configured to:

predict, based on greetings contained in previous electronic messages sent from the message account, a greeting for the body of the electronic message.

14. The computing system of claim 13, wherein, to predict the greeting for the body of the electronic message, the one or more processors are configured to:

predict, based on greetings contained in previous electronic messages sent from the message account that were addressed to the recipient, the greeting for the body of the electronic message.

15. The computing system of claim 13, wherein the one or more processors are further configured to:

identify, using a machine learning model, the greetings contained in the previous electronic messages sent from the message account.

16. The computing system of claim 13, wherein the predicted greeting does not include a name of the recipient.

17. The computing system of claim 13, wherein the predicted greeting includes one or more words other than a name or a salutation of the recipient.

18. The computing system of claim 13, wherein the greeting is further predicted based on a domain of an e-mail address of the recipient.

19. A computer-readable storage medium storing instructions that, when executed, cause one or more processors of a computing system to:

receive an identification of a recipient of an electronic message being composed from a message account associated with a user;

predict, based on text contained in previous electronic messages sent from the message account and using a machine learning model trained based on text contained in the previous electronic messages sent from the message account that were addressed to the recipient, text for a body of the electronic message;

output, for display, the predicted text for optional selection and insertion into the body of the electronic message; and update, based on whether or not the predicted text was selected for insertion into the body of the electronic message, the machine learning model, wherein the electronic message is a first electronic message, wherein the predicted text is first predicted text, and wherein the instructions further cause the one or more processors to:

receive user input to not insert the first predicted text into the body of the first electronic message, wherein the instructions that cause the one or more processors to update the machine learning model comprise instructions that cause the one or more processors to update the machine learning model based on the user input to not insert the first predicted text to generate an updated machine learning model;

predict, based on text contained in previous electronic messages sent from the message account and using the updated machine learning model, second predicted text for a body of a subsequent electronic message to the recipient, wherein the second predicted text is different than the first predicted text; and output, for display, the second predicted text for optional selection and insertion into the body of the electronic message.

* * * * *